Feb. 19, 1924. 1,484,462
G. C. BEALS
BRAKE BAND
Filed Feb. 17, 1922
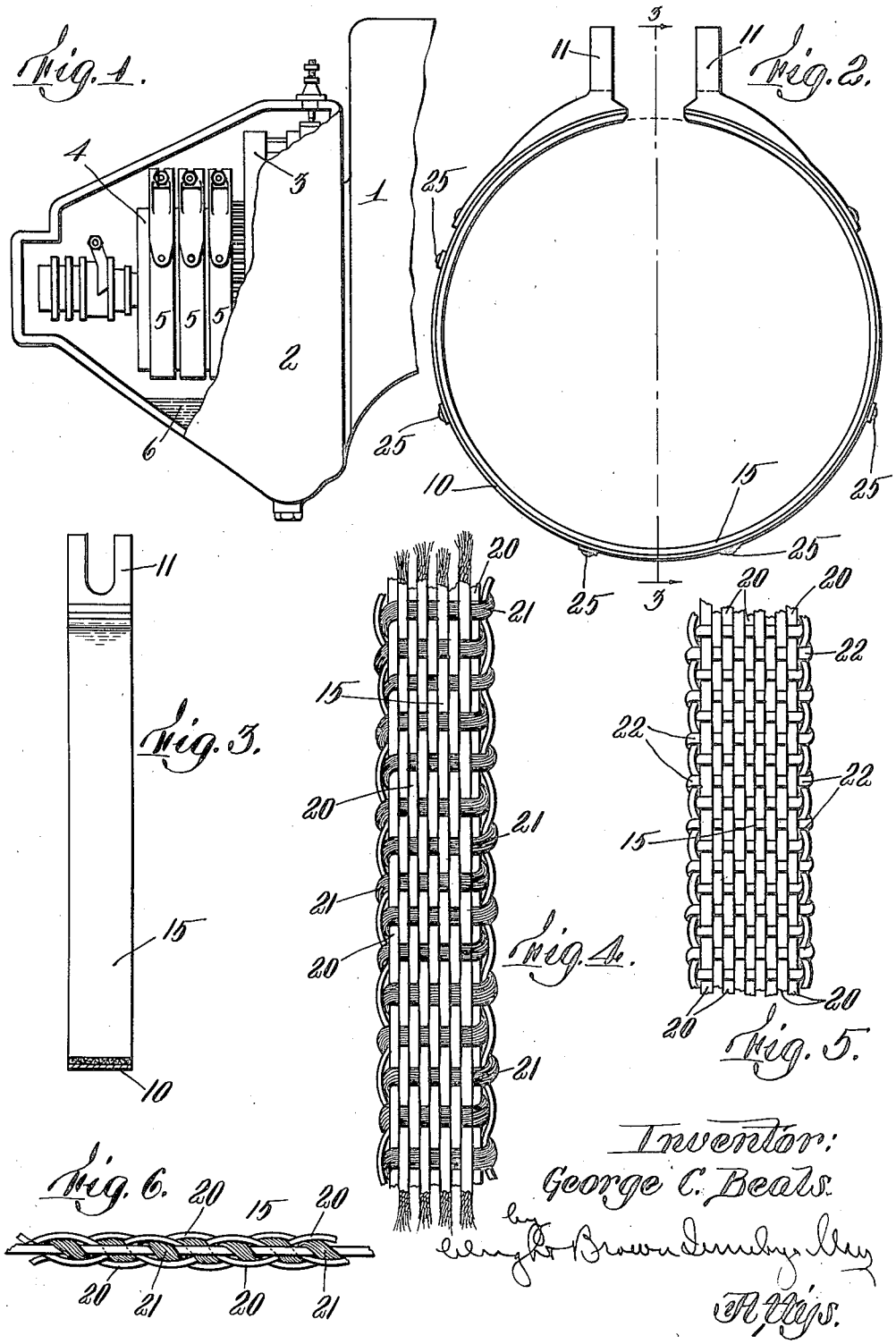
Inventor:
George C. Beals.

Patented Feb. 19, 1924.

1,484,462

UNITED STATES PATENT OFFICE.

GEORGE C. BEALS, OF WINCHENDON, MASSACHUSETTS, ASSIGNOR TO FIBRE FINISHING COMPANY, OF BOSTON, MASSACHUSETTS, A CORPORATION OF MASSACHUSETTS.

BRAKE BAND.

Application filed February 17, 1922. Serial No. 537,234.

*To all whom it may concern:*

Be it known that I, GEORGE C. BEALS, a citizen of the United States, residing at Winchendon, in the county of Worcester and State of Massachusetts, have invented new and useful Improvements in Brake Bands, of which the following is a specification.

This invention relates to brake bands having been more particularly designed for use with planetary transmission mechanisms such as are used for Ford cars. The Ford planetary transmission, together with the engine fly wheel, is positioned within a casing which contains lubricating oil, and the brake bands are therefore subjected to the action of the oil as it is splashed thereon by rotation of the fly wheel. More or less water, gasoline, and other foreign substances also find their way into the casing and during the operation of the engine the oil becomes heated.

This invention, therefore, provides a construction of band which is substantially unaffected by oil or other grease, or other materials such as water or gasoline, and which is at the same time of sufficient strength and softness to serve effectually as a brake.

For this purpose the bands, three of which are used on each transmission, are lined wholly or in part with fibrous material so treated as to be repellent to oils and water even when heated, and yet to be soft and flexible, the lining bands preferably being woven or braided and the surface warp strands, at least, since these bear the greatest wear and strain, being formed of treated fibrous material.

For a more complete understanding of this invention together with further objects and advantageous details and combinations of parts, reference may be had to the accompanying drawings in which Figure 1 is a fragmentary elevation, partly broken away, of the transmission casing of the engine of a Ford car, showing the relative location of the brake bands therein and the engine fly wheel.

Figure 2 is a side elevation of one of the bands drawn to a larger scale.

Figure 3 is a section substantially on line 3—3 of Figure 2.

Figure 4 is a fragmentary plan further enlarged of one form of brake lining.

Figure 5 is a view similar to Figure 4 but illustrating a modified construction.

Figure 6 is an edge view of the form shown in Figure 4.

Referring first to Figure 1, at 1 is shown a portion of the engine frame to the end of which is attached a casing 2. This casing is designed to house the engine fly wheel 3 and a planetary transmission indicated at 4. This transmission comprises a series of drums about which pass brake bands indicated at 5, three of these bands being employed, one of which is tightened about its drum to back the machine, one of which is the service brake for stopping the motion thereof, and the other of which is a low speed brake for the purpose of increasing the gear ratio between the engine and the vehicle wheels. The lower portion of the casing 2 is partially filled with oil as shown at 6 into which the fly wheel 3 projects so that by rotation of this fly wheel the oil is splashed about for the purpose of lubrication.

Each of the brake bands 5, as shown in Figures 2 and 3, comprises an outer band member 10, preferably of metal, to which are made fast at its ends opposed lugs 11 to which means may be attached for drawing the ends of the band together to close in toward and engage its brake drum. The inner face of each band 10 has fast thereto a lining 15 which engages the outer surface of the brake drum.

Referring to Figures 4 and 6 the lining 15 is shown as composed of a series of warp strands 20 having interwoven therewith filling strands 21 to form a fabric. The strands 20 are preferably formed of fibrous material such as paper strips impregnated with strengthening material substantially unaffected by water or the hot oil, gasoline, or other foreign substances likely to be present in the transmission casing to form a soft pliable material.

Various substances for impregnating fibrous material for use in brake bands of this description have been suggested such as the so called drying oils, rubber or asphaltic compositions. The drying oils which solidify by oxidization result in a brittle material not well adapted to conditions met with in transmission casings, while rubber and asphaltic compounds are adversely affected by the oil and gasoline of the transmission case, particularly in the presence of heat.

A substance which has been found admirably adapted for the purpose, however, comprises glutinous material which has been rendered insoluble by treatment with formaldehyde. In making the material it is found desirable to use unsized paper composed of manila rope fiber, or of this fiber admixed with other suitable fiber such as cotton, linen, jute, or wood pulp. This paper is passed through a bath containing glue and glycerin in solution with water whereby this solution becomes absorbed by the sheet, the bath being preferably kept hot to secure proper impregnation. The proportion of glue, glycerin, and water may be varied according to the nature of the paper and the composition of the fibers, but in general should be between one and one-half to four parts of glycerin to one part of glue, and the water from five to eight parts to one part of glue. The glycerin acts as a softening agent and prevents the treated material from becoming brittle. After passing through the impregnating bath the excess impregnating material is removed by any suitable means, and the wet mass is then exposed to formaldehyde either by passing through a solution of formaldehyde or by exposure to the formaldehyde vapor. It is regarded as within the scope of this invention, however, to incorporate the formaldehyde in the glue solution. The sheet is then dried and cut into narrow strips to form the warp strands. This treatment increases the tensile strength of the fiber strands and results in a soft flexible material which is substantially unaffected by water, cold or hot oil, or other grease, gasoline, or other substances likely to be present in the transmission casing, and is admirably adapted to be used as braking material.

The filling strands 21, shown in Figures 4 and 6, may, if desired, be of cotton or asbestos, or other suitable fiber, or the filling strands may also be formed of paper strands treated as above described as shown in Figure 5, in which the filling strands of treated material are indicated at 22. As the warp strands, particularly on the side faces of the fabric, receive the major portion of the strain and wear during the use of the band, it is preferable that they at least be made of the material treated as above. The fabric may be cut into the lengths desired and made fast to the inner face of the bands 10 by any suitable means such as rivets shown at 25 in Figure 2.

Having thus described certain embodiments of this invention it should be evident that many changes and modifications might be made therein without departing from its spirit or scope as defined by the appended claims.

I claim:

1. A brake band comprising fibrous material impregnated with glue and a softening agent, rendered insoluble by exposure to formaldehyde.

2. A brake band comprising fibrous material impregnated with glue and glycerine and rendered insoluble by exposure to formaldehyde.

3. A brake band comprising paper impregnated with water and grease repellent material.

4. A fabric brake band comprising paper strands.

5. A fabric brake band comprising paper strands impregnated with water and grease repellent material.

6. A brake band comprising paper impregnated with insolubilized glutinous material.

7. A fabric brake band comprising paper strands impregnated with insolubilized glutinous material.

8. A fabric brake band having its warp strands composed of paper impregnated with water and grease repellent material.

9. A fabric brake band having its warp strands composed of fibrous material impregnated with insolubilized glutinous material.

10. A fabric brake band having its warp strands composed of paper impregnated with insolubilized glutinous material, and its filling strands of a different material.

11. A brake lining comprising paper strands impregnated with a strengthening agent substantially unaffected by water and grease and forming with the paper strands a soft pliable material.

12. A brake lining fabric comprising woven paper strands impregnated with a strengthening agent substantially unaffected by water and grease and forming a soft pliable material.

13. A brake band composed of fabric certain of the strands of which are composed of paper impregnated with insolubilized glue and glycerine.

In testimony whereof I have affixed my signature.

GEORGE C. BEALS.